United States Patent [19]

Courbin et al.

[11] 4,433,062
[45] Feb. 21, 1984

[54] MOLDABLE FLUOROPHOSPHATE GLASSES CONTAINING $Nb_2O_5$

[75] Inventors: Philippe L. P. Courbin, Bordeaux; Jean P. Mazeau, Avon, both of France

[73] Assignee: Corning Glass Works, Corning, N.Y.

[21] Appl. No.: 437,354

[22] Filed: Oct. 28, 1982

[30] Foreign Application Priority Data

Jun. 4, 1982 [FR] France ............... 82 09731

[51] Int. Cl.³ .............................. C03C 3/16; C03C 3/18
[52] U.S. Cl. ........................................ 501/44; 501/48; 501/901; 501/903
[58] Field of Search ................. 501/44, 48, 903, 901

[56] References Cited

U.S. PATENT DOCUMENTS

| | | | |
|---|---|---|---|
| 3,954,484 | 5/1976 | Broemer et al. | 501/44 |
| 3,979,322 | 9/1976 | Alexeev et al. | 501/48 |
| 4,225,459 | 9/1980 | Faulstich et al. | 501/44 |
| 4,261,751 | 4/1981 | Nakamura et al. | 501/44 |
| 4,380,163 | 5/1983 | Kodama | 501/44 |

FOREIGN PATENT DOCUMENTS

| | | | |
|---|---|---|---|
| 19342 | 11/1980 | European Pat. Off. | 501/44 |
| 2069994 | 9/1981 | United Kingdom | 501/44 |

OTHER PUBLICATIONS

Galant; V. E. et al. "Methods of Producing Fluorphosphate Flints" Soviet J. of Optical Technology.

*Primary Examiner*—Helen M. McCarthy
*Attorney, Agent, or Firm*—C. S. Janes, Jr.

[57] ABSTRACT

The present invention is directed to fluorophosphate glasses containing about 3–21.5% $Nb_2O_5$ and exhibiting softening points below 500° C. The inventive glasses contemplate two general composition areas in weight percent:

| | | | |
|---|---|---|---|
| $P_2O_5$ | 35–46 | $P_2O_5$ | 20–35 |
| $Al_2O_3$ | 3.5–6.5 | $Li_2O$ | 0.5–5 |
| $Li_2O$ | 0.8–3.0 | $Na_2O$ | 0–10 |
| $Na_2O$ | 3–10 | $Li_2O + Na_2O$ | 0.5–10 |
| $Li_2O + Na_2O$ | 5–10.5 | PbO | 0–40 |
| BaO | 18–44 | $Sb_2O_3$ | 0–25 |
| CaO | 0–12 | $PbO + Sb_2O_3$ | 20–50 |
| SrO | 0–15 | BaO | 0–20 |
| MgO | 0–7 | $Al_2O_3$ | 0–5 |
| $BaO + CaO + SrO + MgO$ | 28–47 | $Nb_2O_5$ | 13–21.5 |
| $CaO + SrO + MgO$ | <15 | F | 1–12 |
| $Nb_2O_5$ | 3–8.5 | | |
| F | 4.5–8 | | |

4 Claims, No Drawings

MOLDABLE FLUOROPHOSPHATE GLASSES CONTAINING NB$_2$O$_5$

BACKGROUND OF THE INVENTION

It is known from U.S. Pat. No. 4,285,730, U.K. patent application No. 2,069,994, and European Patent Application No. 0019342 that it is possible to obtain optical elements exhibiting precision surfaces, such as spherical or aspherical lenses, by direct molding or pressing without requiring polishing or other subsequent finishing operation, by using glasses having low transition temperatures Tg (corresponding to a viscosity of $10^{13}$ poises) and softening temperatures or Littleton points $T_L$ (corresponding to a viscosity of $10^{7.6}$ poises). The glasses are formed under pressure at a viscosity generally lying between the two values previously mentioned.

In order not to alter the surface of the molds, one conveniently operates at a molding temperature as low as possible, and preferably lower than 450° C., which requires the glass to have a softening point below 500° C.

Those optical components being destined for the fabrication of complex optical systems, performing and varying, can admittedly be more easily attained if the optical characteristics (refractive index and Abbe number or dispersion) available are numerous and different, as in the case in traditional optical glasses.

U.K. patent application No. 2,069,994 proposes moldable fluorophosphate glasses largely answering those needs. Nevertheless, that patent does not permit the production of glasses stable against devitrification, particularly in the fabrication of massive pieces, which exhibit properties within two regions of optical properties which can be attained only at the application limits of the patent, i.e., at high concentrations of either lead oxide or barium oxide or at a high level of alkaline earth oxides+lead oxide.

But, those two ranges are particularly important in the case of traditional glasses: these are, respectively, the region of "Extra Dense Flints", "Special Barium Flint", "Dense Barium Flint", having an index of refraction $n_D$ greater than 1.68 and an Abbe number $v_D$ less than 38, and the region of the "Dense Barium Crown" having an index of refraction $n_D$ greater than 1.57 and an Abbe number $v_D$ greater than about 55 and, preferably, higher than about 58.

Besides their thermoviscosity and optical properties, the glasses must exhibit good chemical resistance against atmospheric agents or "weathering".

SUMMARY OF THE INVENTION

The present invention has for its object glasses satisfying the above-mentioned criteria regarding the two ranges of optical properties, the inventive glasses containing, besides P$_2$O$_5$ and F, Nb$_2$O$_5$ in an amount not less than about 3% by weight and not more than about 21.5%.

To satisfy the above-mentioned second range of optical properties, the compositions of such glasses, based upon the batched oxides and fluoride in weight percent, consist essentially of:

| | |
|---|---|
| P$_2$O$_5$ | 35–46 |
| Al$_2$O$_3$ | 3.5–6.5 |
| Li$_2$O | 0.8–3.0 |
| Na$_2$O | 3–10 |
| Li$_2$O + Na$_2$O | 5–10.5 |
| BaO | 18–44 |
| CaO | 0–12 |
| SrO | 0–15 |
| MgO | 0–7 |
| BaO + CaO + SrO + MgO | 28–47 |
| CaO + SrO + MgO | <15 |
| Nb$_2$O$_5$ | 3–8.5 |
| F | 4.5–8 |

The batch composition of the glass is calculated in such a manner that the quantity represented as the sum of the oxides in weight percent+fluoride in weight percent—the oxygen equivalent of fluoride (that is, 0.421×% F) is equal to 100%.

Under the experimental conditions utilized, the raw materials, and the melting conditions, the quantity of fluoride analyzed in the glasses comprises about 3.0–6.0%.

The P$_2$O$_5$ content must be less than 46% in order to obtain good resistance to atmospheric agents, while under 35% the tendency to devitrify and the softening point are increased. Al$_2$O$_3$ is indispensable to obtain good chemical resistance; nevertheless, beyond 6.5% the rate of devitrification increases rapidly. Where the alkali metal oxide content is less than 5%, the softening point of the glass becomes higher and the tendency to crystallize increases; while above 10.5%, the chemical resistance and stability of the glass decreases. In general, the cationic percent ratio LiO$_{1/2}$:NaO$_{1/2}$ will preferably be kept close to 1 to ensure good glass stability and chemical durability. Up to 6% K$_2$O may be present, particularly in substitution for Na$_2$O, but this raises the softening point of the glass. Therefore, the preferred glasses will not contain K$_2$O.

BaO and other alkaline earth metal oxides and Nb$_2$O$_5$ are the major constituents determining the optical properties. When the alkaline earth metal content is less that 28%, the refractive index is not sufficiently high, and above 47% the softening point is raised as is the tendency to devitrify. BaO is the preferred alkaline earth metal oxide because the others provide a lower contribution to the index of refraction, which requires a greater amount of Nb$_2$O$_5$; as a consequence the dispersion of the glass is increased. The total of other alkaline earth metal oxides will be limited to about 15% for this reason and for better stability.

The obtaining of the above-mentioned optical properties necessitates the presence of another component than BaO (or BaO+alkaline earth oxides). This component may be PbO, which has approximately the same effect upon the optical properties as does Nb$_2$O$_5$ (based on cationic percents); nevertheless, notably in the presence of high levels of BaO, the glasses display a greater tendency to devitrify. We have found that a substitution of PbO by NbO$_{5/2}$ permits glasses to be obtained more stable to devitrification as is illustrated in Table I. At a lower viscosity, glasses containing PbO mainfest a greater devitrification.

In another kind of experiment consisting of allowing the glass to cool in a platinum crucible while measuring the viscosity in situ, we could observe, with the unaided eye, that a surface crystallization appears at a lower viscosity in glasses containing PbO, thereby confirming qualitatively the stabilization effect of Nb$_2$O$_5$ (Table II). This stabilization effect of Nb$_2$O$_5$ permits the introduction of more Al₂O₃ and thereby imparts a better behavior against atmospheric agents. In addition, at a constant Al₂O₃ content (cation %), replacing PbO with NbO$_{5/2}$ slightly improves the behavior against atmospheric agents and very clearly improves the chemical resistance in acid media.

Above 8.5% Nb₂O₅ the dispersion of the glass is high and the tendency to devitrify increases rapidly, especially for glasses containing high levels of Al₂O₃ and BaO.

In order to obtain the desired optical properties, one must regulate the contents of the components, notably Li₂O, alkaline earth metals, Nb₂O₅, and F. For example, for a batch containing about 7% F and when the sum of alkaline earth metal oxides+Li₂O is less than 36%, the weight percent of Nb₂O₅ must be greater than about 5.5%, the amount of Nb₂O₅ being higher if the BaO content is lower and if the F level is higher.

All the known effects of fluoride apply to these glasses; i.e., the refractive index is decreased (about $-7 \times 10^{-3}$ per 1% of analyzed fluoride), the dispersion is decreased (the Abbe number increases about $+0.7-1$ per 1% of analyzed fluoride), the softening point is decreased (about $-10°$ to $15°$ C. per 1% of analyzed fluoride), and the resistance to atmospheric agents is reduced when its concentration in the glass increases. Beyond those effects it has been observed that outside the limits previously mentioned, and notably for high levels of BaO, the tendency to devitrify increases rapidly.

The glasses may contain small quantities of other oxides like in particular ZnO in the place of an alkaline earth; nevertheless, because the resistance to atmospheric agents is diminished, it will be avoided.

One of the general tendencies for optical applications is the requirement of the glasses to have a high index of refraction and a very low dispersion ($v_d$ high); this factor is notable in minimizing the geometric and/or chromatic aberrations. In the present case, the preferred glasses answering those criteria are obtained in the following composition range, based upon batched oxides in weight percent:

| | |
|---|---|
| P₂O₅ | 37–41 |
| Al₂O₃ | 4.5–5.5 |
| Li₂O | 1.5–2.5 |
| Na₂O | 3.5–6 |
| Li₂O + Na₂O | 5.5–8 |
| BaO | 36–42.5 |
| Nb₂O₅ | 4.5–6.0 |
| Batched F | 5.5–7.5 |
| (Analyzed F) | 3.5–5.8 |

Those glasses have a refractive index higher than 1.575 and an Abbe number higher than 58.0.

To satisfy the first of the above-mentioned range of optical properties, viz., glasses exhibiting refractive indices higher than 1.68 and Abbe numbers lower than 38, the compositions of such glasses, based upon the batched oxides and fluoride in weight percent, consist essentially of:

| | |
|---|---|
| P₂O₅ | 20–35 |
| Nb₂O₅ | 13–21.5 |
| Li₂O | 0.5–5 |
| Na₂O | 0–10 |
| Li₂O + Na₂O | 0.5–10 |
| PbO | 0–40 |
| Sb₂O₃ | 0–25 |
| PbO + Sb₂O₃ | 20–50 |
| BaO | 0–20 |
| Al₂O₃ | 0–5 |
| F | 1–12 | with the level of fluoride in the glass as analyzed ranging between about 0.5–7%.

Preferably, in order to obtain glasses having a softening point below 500° C., very good stability against devitrification, and excellent resistance to atmospheric agents, one will choose the batch composition from the following restricted ranges:

| | |
|---|---|
| P₂O₅ | 22–27 |
| Nb₂O₅ | 18–21 |
| Li₂O | 1.5–2.5 |
| Na₂O | 1–4 |
| BaO | 10–16 |
| PbO | 18–25 |
| Sb₂O₃ | 12–18 |
| F | 3–10 | with the fluoride content of the glass as analyzed ranging between about 1.5–6%.

Nb₂O₅ is again a major oxide for obtaining glasses having a softening point lower than approximately 500° C., a high refractive index (greater than about 1.68 and preferably higher than 1.70), stability against devitrification, and exhibiting very good resistance to atmospheric agents or resistance to "weathering". In effect, in the absence of Nb₂O₅, in order to obtain a high refractive index, the glass must contain, in addition to BaO, a high level of PbO, viz., greater than about 50% which, in the presence of Al₂O₃ which is necessary to maintain good chemical resistance, leads to a strong tendency to devitrify. Nb₂O₅, which has an effect comparable to PbO on the optical properties (based upon cationic percentages) and an effect comparable to Al₂O₃ on resistance to "weathering", permits, by limiting the PbO and Al₂O₃ contents, glass to be obtained answering the criteria previously mentioned. Nb₂O₅, like Al₂O₃, strongly contributes to raising the softening point of the glass.

The Nb₂O₅ level must be higher than about 13% in order to obtain good stability and, especially in the absence of Al₂O₃, a good chemical resistance. This level will be less than about 21.5% since, beyond this point, the tendency to devitrify is increased and the softening point becomes higher, especially when the other components are held within the restricted ranges. Moreover, the cost of the raw materials of the glass increases significantly. Examples 21 and 22 in Table VI illustrate the effect of substituting NbO$_{5/2}$ for PO$_{5/2}$ (10 cation percent) on the properties and particularly on the resistance to "weathering".

Below a P₂O₅ level of 20% the glasses are poorly stable against devitrification for the glass forming conditions utilized. Beyond 35% P₂O₅ the glass generally exhibits a substantially reduced resistance to atmospheric agents compared to that commonly obtained for the glasses of this invention. In addition, glasses with P₂O₅ contents higher than 35% often have an index for refraction incompatible with the desired range.

For the inventive glasses, the PbO content will be limited to about 40% by weight in order to maintain good stability and good chemical resistance. It has been found that Sb₂O₃ may be beneficially substituted for PbO. In effect, that substitution, especially in glasses containing no $Al_2O_3$, increases the stability of the glass against devitrification, as is illustrated in Examples 23 and 24 of Table VI wherein 2.5 cationic percent PbO has been replaced with 2.5 cationic percent $Sb_2O_3$, the other components remaining unchanged on the cationic percentage basis. The replacement of PbO by $Sb_2O_3$ does not effect the other properties of the glasses very much. Nevertheless, as a general rule, it tends to reduce the softening point and to improve the resistance to atmospheric agents, as is illustrated by a comparison of Examples 25 and 26 of Table VI. In Example 26, the modification involves only PbO and $Sb_2O_3$ (10% based upon cationic percentages).

Although glasses stable and exhibiting acceptable chemical resistance have been obtained with $Sb_2O_3$ contents up to 40% by weight, this oxide will be limited to about 25% because of the yellow tint it imparts to the glass.

The sum of $PbO+Sb_2O_3$ which, with $Nb_2O_5$, mainly determines the optical properties of the glass, will be higher than 20% to obtain a high refractive index, good stability, a low softening point, and good chemical resistance. It will be lower than about 50% in order to maintain a very good chemical durability along with good stability against devitrification.

It is necessary that the sum of the alkali metal oxides be greater than 0.5% (in the case of $Li_2O$ alone) in order to be able to obtain glasses having a softening point compatible with the molding process ($T_L \leq 500°$ C.) and which exhibits good stability. In the same way, it is necessary that this sum be less than about 10% in order to maintain good stability and good chemical resistance in the glass. In like manner to the conventional glasses, the mixed alkali effect applies to these glasses and it is, therefore, desirable for resistance to atmospheric agents to find the two oxides, viz., $Li_2O$ and $Na_2O$, in the ratio $LiO_{1/2}$: ($LiO_{1/2}+NaO_{1/2}$) comprising between about 0.5 and 0.75 (based upon cationic percentages).

Fluorine is an essential constituent because it permits maintenance of a low softening point and to improve the transmission of the glass (reduction of the yellow color in the glass for a higher concentration of $PbO+Sb_2O_3$). Consequently, at least 1% and preferably at least 3% (batched content) will be introduced. Nevetheless, above 12% batched the resistance to "weathering" becomes less compared to the best glasses offered in this system and the tendency to devitrify increases rapidly. Besides these effects and as expected, fluorine reduces the refractive index and the dispersion of the glass when it is increased. About 40-60% of the batched fluorine is volatilized away during melting.

$Al_2O_3$ is a facultative oxide which, substituted for $Nb_2O_5$, permits adjustment of the optical properties, if necessary. As already indicated, $Al_2O_3$ is very favorable for resistance to "weathering". Nevertheless, it is necessary that the content of the oxide remain low because the tendency of devitrification of the glass is rapidly increased with it. Preferably, the glasses will not contain it.

BaO is also a facultative oxide. Nevertheless, when it is substituted for alkalimetal oxides (based upon cationic percentages), it permits the value of the refractive index and the resistance to atmospheric agents to be increased, while maintaining a softening point sufficiently low for the purpose of these glasses. Therefore, the preferred glasses will contain it. BaO is the preferred alkaline earth metal oxide because it permits good stability against devitrification to be retained in the glass. Nevertheless, it must be noted that it is possible to utilize other alkaline earth metal oxides in substitution for BaO. Above 20% BaO, the tendency for devitrification of the glass increases.

The most preferred glass is represented by Example 27. It is preferred because of its excellent chemical resistance and its high stability against devitrification. Therefore, it can be obtained without crystallization up to a viscosity of 500 poises for a pouring time of about ten minutes. On the other hand, this same glass can remain three hours or more at about 100 poises without observing any devitrification being produced. For all these reasons, the restricted range of compositions previously mentioned and leading to the remarkable properties has been defined.

DESCRIPTION OF PREFERRED EMBODIMENTS

The glasses of the second embodiment of the invention are obtained starting from a vitrifiable batch prepared in the usual manner. The batch contains products chosen among, for example: phosphorus anhydride, barium phosphate, barium fluoride, barium carbonate, aluminum metaphosphate, calcined alumina, aluminum fluoride, phosphates or carbonates or fluorides of sodium and lithum, niobium oxide.

A batch representing about 1-25 kg of glass is melted in a platinum crucible in a temperature range of 800°-1200° C. for a period of 3-16 hours. The glasses are generally homogenized with the aid of a platinum stirrer. After the firing operation the glass is brought to a temperature corresponding to a viscosity comprising between about 1 and 100 poises in order to proceed to the formation of bars having a cross section that may attain, for example, 150×25 mm; in general the cross section of the bars is 60×20 mm. The duration of the forming operation is preferably less than one hour and the temperature is regulated as a function of the tendency to devitrify and considering also that the stability of the index of refraction and the optical quality of the glass (absence of "cords" or local variations of refractive index) are generally more difficult to attain if the viscosity of glass is lower. For the glasses of the invention the temperature of forming is in the range of 650°-750° C.

After forming, the glass is annealed at a temperature of 350°-400° C. during 30 minutes to one hour and cooled down to ambient temperature at about 80°-100° C./hour.

The invention is illustrated through the examples of Table III (calculated or theoretical compositions, i.e., the oxide values are determined from the batch ingredients utilized). Some glasses have been analyzed via X-ray spectrometry using Example 1 as the reference. The results are given in Table IV. Outside of the optical properties, refractive index and Abbe number for the "d" line of helium, the softening point and the resistance to atmospheric agents have been determined. The softening point of the glass has been estimated with the aid of a method developed in the laboratory which gives a temperature of 10°-25° C. in excess with respect to the conventional point of Littleton. This method consists of sagging a disc of glass having a diameter of 32 mm and a thickness of 4 mm in a kiln where the rate of heating is 60° C./hour. The sample holder having been made the object of a standard, the approximate softening temperature is read when the glass comes to obstruct a leak of air placed under the part. This method is sufficient to permit a good selection of the so-called "moldable" glasses and it offers the advantage of being able to determine the approximate softening point of glasses for which the conventional method is not adequate (crystallization of the glass occurs during drawing of fibers).

The resistance to atmospheric agents, also called resistance to "weathering", is evaluated through the following test: polished discs of a diameter of about 32 mm and a thickness of about 6 mm are placed into a humid atmosphere (98% relative humidity) maintained at 50° C. The samples are observed periodically (intervals of about 1-3 days) and this during about 30 days. The samples are classed A, B, C, D or E following the level of attack observed with the unaided eye under intense illumination. The classification is as follows: A: no attack observed; B: some points of attack or slight diffusion of light visible only under illumination; C: many points of attack or considerable diffusion of light visible only under illumination; D: points of attack and diffusion of light visible with normal ambient light; E: very considerable attack.

Table V gives some additional properties of the preferred glasses, viz., Examples 1 and 2, which represent a good compromise of all the properties. In particular, their resistance to atmospheric agents is equivalent to that of one of the typical conventional glasses of the "Barium Crown Dense" family like the commercial "C2060" manufactured by Corning France, with a refractive index of 1.62 and an Abbe number of about 60. For comparable optical and chemical properties, the inventive glasses have a softening point about 250° C. lower than those of that family.

The inventive glasses can receive an anti-reflective treatment; for example, a magnesium fluoride deposit through vacuum evaporation, which also permits the resistance to atmospheric agents to be improved.

It is to be noted that the glasses were classified as "B" just after the polishing operation. On the other hand, experience shows that the polished surface obtained through direct molding exhibited an appreciably better durability to atmospheric agents or, in other words, a better resistance to "weathering."

TABLE I

| Batch Compositions in Cationic Percent | | | | |
|---|---|---|---|---|
| | Example 2 | | Example 10 | |
| $PO_{5/2}$ | 43.92 | 43.92 | 44.14 | 44.14 |
| $AlO_{3/2}$ | 7.96 | 7.96 | 8.0 | 8.0 |
| $LiO_{\frac{1}{2}}$ | 11.44 | 11.44 | 12.5 | 12.5 |
| $NbO_{5/2}$ | 2.99 | — | 3.0 | — |
| BaO | 22.75 | 22.75 | 19.86 | 19.86 |
| $NaO_{\frac{1}{2}}$ | 10.95 | 10.95 | 12.5 | 12.5 |
| PbO | — | 2.99 | — | 3.0 |
| F (Weight %) | 7.0 | 7.0 | 6.0 | 6.0 |
| Pouring Temperature (°C.) | 700 | 700 | 700 | 690 |
| Pouring Viscosity (poises) | 35 | ~20 | 25 | 12 |
| Pouring Time (minutes) | 10 | 10 | 10 | 10 |
| Observation of Glass w/Optical Microscope | No Crystals | Very High Crystallization | No Crystals | Very High Crystallization |

TABLE II

| Batch Compositions in Cationic Percent | | | | |
|---|---|---|---|---|
| | Example 10 | | Example 16 | |
| $PO_{5/2}$ | 44.14 | 44.14 | 41.0 | 41.0 |
| $AlO_{3/2}$ | 8.0 | 8.0 | 6.0 | 6.0 |
| $LiO_{\frac{1}{2}}$ | 12.5 | 12.5 | 12.5 | 12.5 |
| $NbO_{5/2}$ | 3.0 | — | 4.0 | — |
| BaO | 19.86 | 19.86 | 9.0 | 9.0 |
| $NaO_{\frac{1}{2}}$ | 12.5 | 12.5 | 12.5 | 12.5 |
| CaO | — | — | 6.0 | 6.0 |
| MgO | — | — | 9.0 | 9.0 |
| PbO | — | 3.0 | — | 4.0 |
| F (Weight %) | 6.0 | 6.0 | 7.0 | 7.0 |
| Viscosity (poises) at which surface crystallization is observed with unaided eye | ~400 | ~10 | ~800 | ~100 |

TABLE III

| Batches in Parts by Weight | | | | | | | | | |
|---|---|---|---|---|---|---|---|---|---|
| | 1 | 2 | 3 | 4 | 5 | 6 | 7 | 8 | 9 |
| $P_2O_5$ | 39.77 | 39.77 | 38.97 | 38.55 | 40.25 | 39.66 | 39.14 | 41.35 | 40.56 |
| $Al_2O_3$ | 5.18 | 4.92 | 5.84 | 5.14 | 5.24 | 5.16 | 5.10 | 3.86 | 4.52 |
| $Li_2O$ | 2.37 | 2.07 | 2.38 | 2.35 | 2.40 | 2.36 | 0.93 | 2.36 | 2.36 |
| $Nb_2O_5$ | 5.06 | 4.81 | 5.07 | 6.69 | 5.12 | 3.37 | 4.98 | 5.03 | 5.05 |
| BaO | 38.66 | 42.27 | 38.76 | 38.34 | 39.11 | 40.49 | 38.05 | 38.45 | 38.56 |
| $Na_2O$ | 4.92 | 4.11 | 4.93 | 4.88 | 4.98 | 4.90 | 7.74 | 4.89 | 4.90 |
| F | 7.0 | 7.0 | 7.0 | 7.0 | 5.0 | 7.0 | 7.0 | 7.0 | 7.0 |
| $n_D$ | 1.5755 | 1.5840 | 1.5781 | 1.5818 | 1.5883 | 1.5712 | 1.5702 | 1.5766 | 1.5768 |
| $v_d$ | 59.0 | 59.5 | 59.3 | 57.2 | 58.4 | 61.5 | 59.2 | 58.8 | 59.0 |
| Approximate Softening Point (°C.) | 460 | 478 | — | 464 | 488 | 450 | 462 | 440 | 452 |
| Weathering Class After | | | | | | | | | |
| 1 Day | B | B | — | B | B | — | B | B-C | B-C |
| 3 Days | C-D | B-C | — | C | B | — | — | D | D |
| 7 Days | D | C | — | C-D | B-C | — | D | D | D |

| | 10 | 11 | 12 | 13 | 14 | 15 | 16 | 17 |
|---|---|---|---|---|---|---|---|---|
| $P_2O_5$ | 40.01 | 42.91 | 42.62 | 43.69 | 43.09 | 45.08 | 43.62 | 35.09 |
| $Al_2O_3$ | 5.21 | 5.02 | 5.37 | 5.69 | 5.61 | 5.14 | 4.59 | 3.72 |
| $Li_2O$ | 2.38 | 1.84 | 2.46 | 2.60 | 2.57 | 2.69 | 2.80 | 2.09 |
| $Nb_2O_5$ | 5.09 | 4.91 | 6.99 | 5.56 | 5.48 | 7.65 | 7.97 | 4.85 |
| BaO | 38.89 | 37.47 | 33.01 | 29.64 | 29.24 | 21.76 | 20.69 | 42.64 |
| $Na_2O$ | 4.95 | 3.81 | 5.50 | 5.40 | 5.33 | 5.57 | 5.80 | 4.15 |
| CaO | — | — | — | — | 4.63 | 8.07 | 5.44 | 3.41 |
| MgO | — | — | — | 3.37 | — | — | 5.05 | — |
| F | 6.0 | 7.0 | 7.0 | 7.0 | 7.0 | 7.0 | 7.0 | 7.0 |
| $n_D$ | 1.5800 | 1.5820 | 1.5811 | 1.5701 | 1.5708 | 1.5734 | 1.5778 | 1.5879 |
| $v_d$ | 59.2 | 59.0 | 56.7 | 59.3 | 59.2 | 56.9 | 56.6 | 58.7 |

TABLE III-continued

| Batches in Parts by Weight | | | | | | | | |
|---|---|---|---|---|---|---|---|---|
| Approximate Softening Point (°C.) | 460 | 478 | 465 | 477 | 462 | 455 | 490 | 470 |
| Weathering Class After | | | | | | | | |
| 1 Day | B | B | B | — | B | B | — | — |
| 3 Days | B-C | B | B | — | B | B | — | — |
| 7 Days | C-D | C | C | — | C | C | — | — |

TABLE IV

| | Analyzed Compositions (Weight Percent) | | | | | | |
|---|---|---|---|---|---|---|---|
| | 1 | 2 | 4 | 5 | 9 | 10 | 11 |
| $P_2O_5$ | 39.62 | 36.69 | 37.95 | 40.07 | 40.32 | 39.56 | 41.97 |
| $Al_2O_3$ | 5.20 | 4.84 | 5.18 | 5.21 | 4.61 | 5.14 | 4.99 |
| $Li_2O$ | 2.66 | N.A.* | N.A. | N.A. | N.A. | N.A. | N.A. |
| $Nb_2O_5$ | 5.84 | 5.19 | 7.45 | 5.86 | 5.81 | 5.78 | 5.71 |
| BaO | 38.57 | 40.87 | 37.10 | 38.39 | 38.50 | 38.14 | 36.88 |
| $Na_2O$ | 5.25 | 4.16 | 4.88 | 5.27 | 5.17 | 5.12 | 4.04 |
| F | 5.36 | 5.09 | 5.51 | 3.58 | 4.85 | 4.76 | 3.75 |

*Not Analyzed $Al_2O_3$, $Na_2O$, and $Li_2O$ were determined via atomic absorption. BaO and $Nb_2O_5$ were analyzed via atomic emission plasma, and F was measured via pyrohydrolysis and colorimetry.

The analyzed values of $Nb_2O_5$ are generally higher than the batched values. This resulted very probably from the volatilization of the other constituents during melting.

TABLE V

| | Batches in Parts by Weight | | Analyzed in Weight % Commercial Glass "C2060" | |
|---|---|---|---|---|
| | 1 | 2 | | |
| $P_2O_5$ | 39.77 | 37.77 | $SiO_2$ | 29.9 |
| $Al_2O_3$ | 5.18 | 4.92 | $Al_2O_3$ | 2.4 |
| $Li_2O$ | 2.37 | 2.07 | $B_2O_3$ | 17.5 |
| $Nb_2O_5$ | 5.06 | 4.81 | $As_2O_3$ | 0.1 |
| BaO | 38.66 | 42.27 | BaO | 49.9 |
| $Na_2O$ | 4.92 | 4.11 | $Sb_2O_3$ | 0.2 |
| F | 7.0 | 7.0 | | |
| $n_D$ | 1.5755 | 1.5840 | | 1.6204 |
| $v_d$ | 59.0 | 59.5 | | 60.3 |
| Approximate Softening Point (°C.) | 460 | 478 | | 738 |
| Vitreous Transition Temperature (°C.) | 368 | 389 | | 650 |

TABLE V-continued

| | Batches in Parts by Weight | | Analyzed in Weight % Commercial Glass "C2060" |
|---|---|---|---|
| | 1 | 2 | |
| by Dilatometry Coefficient of Thermal Expansion (20°–300° C.) | $141.9 \times 10^{-7/1 °C.}$ | $136.6 \times 10^{-7}/°C.$ | $69 \times 10^{-7}°C.$ |
| Weathering Class After | | | |
| 1 Day | B | B | B |
| 3 Days | C-D | B-C | C-D |
| 7 Days | D | C | D |

Glasses exemplifying the first embodiment of the invention have been prepared by melting batches in platinum crucibles and forming the melts into bars, as was previously described with respect to glasses within the second embodiment of the invention. The methods for characterizing the glasses have also been previously described and the starting materials utilized were the fluorides of lead, barium, sodium, and lithium, the phosphates of barium, aluminum, and lithium, the oxides of aluminum, antimony, niobium, and lead, and $P_2O_5$.

TABLE VI

| | Batches in Parts by Weight | | | | | | | | | |
|---|---|---|---|---|---|---|---|---|---|---|
| | 21 | 22 | 23 | 24 | 25 | 26 | 27 | 28 | 29 | 30 |
| $P_2O_5$ | 39.35 | 29.40 | 23.74 | 24.57 | 22.24 | 23.89 | 23.61 | 23.17 | 25.59 | 23.04 |
| $Li_2O$ | 1.66 | 1.55 | 2.14 | 2.24 | 2.04 | 2.14 | 2.11 | 2.07 | 2.69 | 2.08 |
| $Na_2O$ | 3.44 | 3.21 | 1.46 | 1.55 | 1.36 | 1.46 | 1.44 | 1.41 | 2.40 | 1.44 |
| BaO | 17.00 | 15.92 | 14.66 | 15.14 | 13.69 | 14.76 | 14.59 | 14.32 | 7.90 | 14.22 |
| $Nb_2O_5$ | — | 14.08 | 12.75 | 13.21 | 17.58 | 19.22 | 19.00 | 18.65 | 20.54 | 18.50 |
| $Al_2O_3$ | 2.85 | 2.62 | — | — | — | — | — | — | — | — |
| PbO | 24.75 | 23.12 | 42.41 | 33.21 | 39.92 | 21.46 | 21.20 | 20.82 | 22.98 | 31.06 |
| $Sb_2O_3$ | 8.08 | 7.57 | — | 7.19 | — | 14.18 | 14.01 | 13.75 | 15.02 | 6.76 |
| F Batched | 5 | 5 | 5 | 5 | 5 | 5 | 7 | 10 | 5 | 5 |
| F Analyzed | — | — | — | — | — | 2.7 | 3.1 | 5.2 | 2.7 | N.A. |
| $n_D$ | 1.652 | 1.717 | Glass Crystallized | Glass | 1.80 | 1.788 | 1.769 | 1.731 | 1.782 | 1.785 |
| $v_d$ | 43.5 | 35.0 | | | 30.0 | 29.8 | 3.12 | 33.4 | 29.4 | 30.4 |
| Softening Point (°C.) | 415 | 475 | | | 500 | 470 | 460 | 417 | 440 | 468 |
| Weathering Class After | | | | | | | | | | |
| 1 Day | C | A | | | B | A | A | A | A | B |
| 3 Days | D | A | | | B | A | A | B | B | C |
| 7 Days | D | B | | | C | B | B | C | C | D |
| Coefficient of Thermal Expansion (20°–300° C.) [$\times 10^{-7}$/°C.] | — | 120 | — | — | 123 | 115 | 121 | — | — | — |

We claim:

1. A glass composition of the fluorophosphate type containing niobium oxide having a softening point no higher than 500° C. and being suitable for direct forming of optical components through molding or pressing exhibiting precision surfaces selected from the group of:
   (a) a zinc-free glass composition having a refractive index higher than about 1.57 and an Abbe number higher than about 55 and consisting essentially, in weight percent on the oxide basis as batched, of

| | | | |
|---|---|---|---|
| P$_2$O$_5$ | 35–46 | SrO | 0–15 |
| Al$_2$O$_3$ | 3.5–6.5 | MgO | 0–7 |
| Li$_2$O | 0.8–3.0 | BaO + CaO + SrO + MgO | 28–47 |
| Na$_2$O | 3–10 | CaO + SrO + MgO | <15 |
| Li$_2$O + Na$_2$O | 5–10.5 | Nb$_2$O$_5$ | 3–8.5 |
| BaO | 18–44 | F | 4.5–8 |
| CaO | 0–12 | | | and (b) an aluminum-free glass composition having a refractive index between about 1.68–1.85 and an Abbe number <38 and consisting essentially, in weight percent on the oxide basis as batched, of

| | | | |
|---|---|---|---|
| P$_2$O$_5$ | 30–35 | Sb$_2$O$_3$ | 0–25 |
| Li$_2$O | 0.5–5 | PbO + Sb$_2$O$_3$ | 20–50 |
| Na$_2$O | 0–10 | BaO | 0–20 |
| Li$_2$O + Na$_2$O | 0.5–10 | Nb$_2$O$_5$ | 13–21.5 |
| PbO | 0–40 | F | 1–12 |

2. A glass composition according to claim 1 having a refractive index higher than about 1.575 and an Abbe number higher than about 58 and consisting essentially, in weight percent on the oxide basis as batched, of

| | |
|---|---|
| P$_2$O$_5$ | 37–41 |
| Al$_2$O$_3$ | 4.5–5.5 |
| Li$_2$O | 1.5–2.5 |
| Na$_2$O | 3.5–6 |
| Li$_2$O + Na$_2$O | 5.5–8 |
| BaO | 36–42.5 |
| Nb$_2$O$_5$ | 4.5–6.0 |
| F | 5.5–7.5 |

3. A glass composition according to claim 1 consisting essentially, in weight present on the oxide basis as batched, of

| | |
|---|---|
| P$_2$O$_5$ | 22–27 |
| Li$_2$O | 1.5–2.5 |
| Na$_2$O | 1–4 |
| PbO | 18–25 |
| Sb$_2$O$_3$ | 12–18 |
| BaO | 10–16 |
| Nb$_2$O$_5$ | 18–21 |
| F | 3–10 |

4. A glass composition according to claim 3 having a refractive index of 1.769 and an Abbe number of 31.2 and consisting essentially, in weight percent on the oxide basis as batched, of:

| | |
|---|---|
| P$_2$O$_5$ | 23.61 |
| Li$_2$O | 2.11 |
| Na$_2$O | 1.44 |
| PbO | 21.20 |
| Sb$_2$O$_3$ | 14.01 |
| BaO | 14.59 |
| Nb$_2$O$_5$ | 19.00 |
| F | 7 |

* * * * *

UNITED STATES PATENT AND TRADEMARK OFFICE
CERTIFICATE OF CORRECTION

PATENT NO. : 4,433,062
DATED : February 21, 1984
INVENTOR(S) : Philippe L. P. Courbin & Jean P. Mazeau It is certified that error appears in the above-identified patent and that said Letters Patent is hereby corrected as shown below:

Column 4, line 41, change "glass" to -- glasses --.

Column 4, line 63, change "for" to -- of --.

Column 5, line 8, change "effect" to -- affect --.

Table VI, column heading 29, line 10, change "2.7" to -- 2.75 --.

*Signed and Sealed this*

*Thirty-first* Day of *July 1984*

[SEAL]

*Attest:*

GERALD J. MOSSINGHOFF

*Attesting Officer*     *Commissioner of Patents and Trademarks*